March 7, 1950

L. A. MEDLAR 2,499,663

SAFETY DEVICE FOR THERMALLY CONTROLLED BATTERY CHARGES

Filed June 8, 1949

INVENTOR.
LEWIS A. MEDLAR
BY
Stone, Boyden & Mack,
Attorneys

March 7, 1950     L. A. MEDLAR     2,499,663
SAFETY DEVICE FOR THERMALLY
CONTROLLED BATTERY CHARGES Filed June 8, 1949     5 Sheets-Sheet 2

INVENTOR.
LEWIS A. MEDLAR
BY
Stone, Boyden & Mack,
Attorneys

FIG. 5A

INVENTOR.
LEWIS A. MEDLAR,
BY
Stone, Boyden & Mack,
Attorneys

INVENTOR.
LEWIS A. MEDLAR
BY
Stone, Boyden & Mack,
Attorneys

March 7, 1950

L. A. MEDLAR 2,499,663

SAFETY DEVICE FOR THERMALLY CONTROLLED BATTERY CHARGES

Filed June 8, 1949

INVENTOR.
LEWIS A. MEDLAR
BY
Stone, Boyden & Mack
Attorneys

Patented Mar. 7, 1950

2,499,663

UNITED STATES PATENT OFFICE 2,499,663

SAFETY DEVICE FOR THERMALLY CONTROLLED BATTERY CHARGERS

Lewis A. Medlar, Oreland, Pa., assignor, by mesne assignments, to Sterlingworth Company, Philadelphia, Pa., a corporation of Delaware Application June 8, 1949, Serial No. 97,772

19 Claims. (Cl. 320—36)

This invention relates to safety devices for that class of battery chargers embodying a thermally responsive element subjected to the internal temperature of the battery being charged and acting, through a suitable control circuit, to control the supply of charging current to the battery in response to changes of the internal temperature of the battery as they occur during progress of the charge.

It was discovered early in the battery charger art that storage batteries are subject to serious damage from unduly high internal temperatures, and that it is therefore undesirable to continue charging a battery after the internal temperature has reached a predetermined safe maximum. There is considerable difference of opinion among those skilled in the art as to precisely what temperature can be considered as the safe maximum internal temperature of a storage battery during charging. Though there is some evidence that higher temperatures may be attained with safety, 125° F. has been generally accepted as a safe maximum.

A number of proposals have been made involving automatic thermally responsive cutoff devices for terminating the charge upon occurrence of a predetermined maximum internal temperature, and such devices have generally followed along the lines of the device described in early U. S. Patent No. 976,748 to Schmidt.

More recently, there has come into general use a type of battery charger known as a fast charger, capable of recharging batteries in a relatively short time at a relatively high rate. Such devices are usually controlled by either a time switch or by an element that is thermally responsive to the internal temperature of the battery being charged. The time switch controlled charger is simply turned off after a pre-set time interval. The interval is set to obtain a reasonably complete charge and is usually, but not always, limited enough that the battery does not overheat. To guarantee that the battery temperature does not become excessive, a thermally responsive element can be adapted to terminate the charge before the time switch has done so. This system is described in U. S. Patent 2,354,877 to Peters.

Many fast chargers now in commercial use do not use a time switch at all but depend entirely on a thermally sensitive element inserted into the battery and adapted to control the charge in response to battery temperature. Such chargers operate to charge the battery until the battery temperature reaches the aforementioned limit of 125° F. At this temperature, the charge is terminated, and it has been found that a battery so charged is usually substantially fully charged.

Fast chargers have also been proposed wherein the charge is terminated or controlled according to the temperature rise of the battery being charged. These devices also provide safe maximum temperature cutoff action and requires thermally sensitive elements inserted into the battery. Such chargers are discussed in detail in co-pending application, Serial Number 123,722, filed October 26, 1949.

Though many attempts have been made to produce a commercially practical thermally controlled battery charger, none offered on the market up to the time of the present invention has, to my knowledge, been completely successful. The primary fault with thermally controlled battery chargers now available in the trade is the lack of means for preventing the charger from supplying current to the battery in the event that the thermally responsive element has inadvertently not been immersed in the battery electrolyte and therefore is not subjected to the changes in internal temperature of the battery resulting from the charge. Failure to insert the thermally responsive element in the battery, or accidental removal of this element from the battery, is likely to cause either one of two serious troubles, depending upon the particular type of charger being used. If the charger is one of that general class typified by the aforementioned Peters patent, employing a time switch and with the thermal control circuit designed to de-energize the charger if a predetermined maximum safe internal battery temperature occurs during charging, failure to insert the thermally responsive element is likely to result in the charge continuing after the battery has reached a dangerously high temperature, particularly if the initial temperature of the battery is high. If the charger is of the type wherein a thermally responsive control circuit is substituted for the time switch, then there is no effective means at all for terminating the charge, and the battery may be subjected to a damaging overcharge until the operator realizes his mistake.

In either case, the damage results from failure of the operator to insert the thermally responsive control element in the battery, or accidental removal of the element from the battery, and prior to the present invention the industry has been unable to overcome this inherent defect.

An object of the present invention is to provide, in a battery charging apparatus including electro-responsive means under influence of a thermally responsive unit subjected to the internal temperature of the battery being charged, a safety device including electro-responsive means controlled by the presence or absence of the thermally responsive unit in the battery.

A further object of the present invention is to provide, in a battery charger controlled by an element responsive to the internal temperature of the battery being charged, automatic safety means for preventing the supply of charging current by the charger unless the thermally responsive element is so positioned as to be subjected to the internal temperature of the battery being charged.

A further object of the present invention is to provide such safety means capable of use with various type of thermally responsive elements.

A still further object of the invention is to provide such safety means capable of use either where a thermally responsive device is employed only as a maximum temperature cutoff in connection with a time-controlled switch, or where the thermally responsive device serves to itself determine the duration of the charge, or where the thermally responsive device is employed only to actuate an electro-responsive signal.

Yet another object of the invention is to provide such automatic safety means wherein a positive signal is given to the operator in the event that an attempt is made to energize the charger when the thermally responsive element is not subjected to the internal temperature of the battery.

In order that the invention may be readily understood, reference is had to the accompanying drawings forming a part of this specification, and in which.

Figure 1:
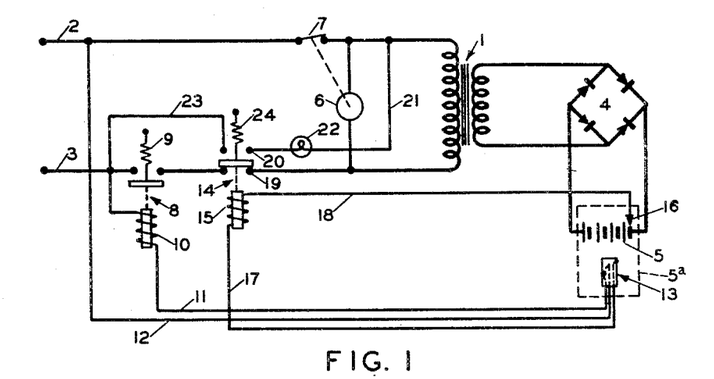
Fig. 1 is a schematic diagram illustrating one form of the invention, as applied to a conventional battery charger, and employing a thermostatic switch as the thermally sensitive element responsive to internal battery temperature.

Referring in detail to the drawings, and more particularly to Fig. 1, the invention will first be described as applied to a charger of the so-called fast charging type provided with a thermostat responsive to the battery temperature for interrupting the supply of current upon occurrence of a predetermined maximum internal battery temperature.

The charging circuit of this embodiment comprises a transformer 1 supplied from an alternating current source through conductors 2 and 3, the output of the transformer being connected through rectifier 4 to the battery 5 to be charged. The casing of battery 5 is illustrated diagrammatically at 5ª. As is now usual practice in this art, a synchronous motor 6 is connected across the transformer input circuit and is arranged to actuate switch 7 through a suitable clock mechanism, not shown, for making and breaking the transformer input circuit.

A relay 8, normally biased to closed position, as by spring 9, is arranged to break the charging circuit when energized. In this case, winding 10 of the relay is connected across the transformer input circuit, as by conductors 11 and 12, through a thermally responsive switch shown diagrammatically at 13. It will be seen that, if the thermally responsive switch is closed, relay 8 will be actuated to open position, breaking the charging circuit, while if the thermally responsive switch is open, relay 8 will be relaxed and closed by spring 9. If, for example, the switch is adjusted to close at 125° F., and is arranged within the battery being charged, relay 8 will remain closed while the internal temperature of the battery is below 125° F., and will automatically open if the internal temperature of the battery exceeds 125° F. This general arrangement is well known in the art and is shown, for example, in the Peters patent previously mentioned herein.

In actual use, if a device of this type is employed, dangerous overcharging may result if the operator neglects to insert switch 13 in the battery. If switch 13 is not in the battery, and the battery is at a relatively low state of charge but a relatively high initial temperature, as is quite likely on warm summer days, a dangerous battery temperature may occur before the time for which the clock switch is adjusted has elapsed.

The invention, in the embodiment shown in Fig. 1, includes a casing for the thermostatic switch 13, at least a portion of this casing constituting an exteriorly exposed electrically conductive element, as shown for example in Fig. 2 and hereinafter described, a second relay 14 in the transformer input circuit of the charger, and a circuit connecting winding 15 of relay 14 to the conductive portion of said casing and to one of the terminals 16 of battery 5, said circuit comprising conductors 17 and 18. Relay 14 is provided with two sets of contacts, 19 and 20, contacts 19 being in the transformer input circuit and contacts 20 in an indicating or signal circuit comprising conductor 21, a signal 22, such as a light or bell, and conductor 23, the circuit being connected across the transformer input circuit between the transformer and switch 7. Relay 14 is normally biased, as by a spring 24, to close contacts 20 and open contacts 19.

Figure 2:
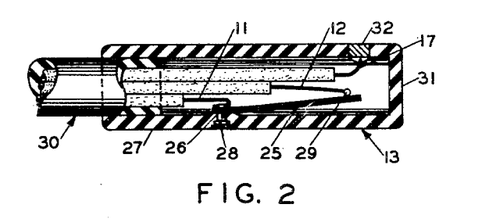
Fig. 2 is a detailed longitudinal section through one form of thermostatic switch unit embodying the invention and employed to control the circuit of Fig. 1, parts being shown in elevation.

One example of a thermostatic switch unit which can be used with the apparatus just described is shown in Fig. 2. Here, the thermostatic switch is illustrated as comprising a bi-metal strip 25 secured at one end 26 to a casing 27, as by a threaded element 28, and arranged to flex into and out of engagement with a fixed contact pin 29 carried by the casing. Casing 27 is sealed over the end of a conventional insulated three-conductor cable 30, as by use of acid resistant adhesive or other means, and is provided with a closed end 31, so that, in use, entrance of battery electrolyte into the casing is prevented. Casing 27 is, in this embodiment of the invention, entirely of a suitable acid-resistant electrical insulating material except for electrically conducting plug 32 extending entirely through the casing wall and thus being capable of being placed into electrical contact with the electrolyte of the battery to be charged. Cable 30 comprises conductors 11, 12 and 17, previously identified in Fig. 1, conductors 11 and 12 being connected to the thermostatic switch, and conductor 17 being connected to conducting plug 32.

Since the thermostatic switch itself may be of any conventional type, and the present invention does not depend upon the particular type of switch chosen, the switch elements have been illustrated only diagrammatically. It will be understood by those skilled in the art that such devices are usually of the snap-acting type and are provided with suitable means by which the switch may be adjusted to operate at a desired temperature. It is sufficient that the switch be of any type capable of responding to the desired temperatures, and that the unit as a whole be constructed to be inserted in the battery to be charged and to communicate the internal heat of the battery to the switch.

When the unit illustrated in Fig. 2 is employed with the circuit of Fig. 1, conductors 11 and 12 are connected to one side of winding 10 of relay 8, and to power lead 2, respectively. Casing 27 is adapted to be inserted through a filling opening of the battery to be charged, and cable 30 is of sufficient length to reach from the charger to the battery being charged. When the thermostat unit is properly inserted in the battery, preferably through the middle filling opening when the battery being charged is a three-cell battery, conductive plug 32 comes into electrical contact with the battery electrolyte, and a circuit comprising plug 32, conductor 17, winding 15 of relay 14, conductor 18, battery terminal 16, and the battery electrolyte, is thus completed. Completion of this circuit thus supplies current from the battery to winding 15 of relay 14, energizing the relay to cause contacts 19 to be closed and contacts 20 to be opened. If plug 32 is not in electrical contact with the battery electrolyte, relay 14 will not be energized, contacts 20 will be closed and contacts 19 will remain open. Thus, when the thermostatic switch unit is inserted in the battery in order that the switch may be subjected to the internal battery temperature, the charging circuit will be energized, presuming relay 8 to be closed. But, when the thermostatic switch unit is not so inserted, the charging circuit cannot be energized, and signal 22 is operated, if switch 7 is closed.

Though battery charges employing thermostatic switches have been somewhat successful commercially, use of a thermostatic switch is often objectionable because of the relatively delicate nature of the switch structure. Since the switch unit must be insertable in the battery being charged, it is connected into the charger proper by a relatively long electric cable, and since the cable often hangs free from the charger casing, the thermostat unit is subjected to relatively severe mechanical shocks during handling of the charger. This frequently results in failure of the thermostatic switch unit.

As disclosed in co-pending application, Serial No. 87,494, to James B. Godshalk and Lewis A. Medlar, filed April 14, 1949, it has been found that this disadvantage can be eliminated by employing in place of the thermostatic switch a thermally variable impedance, and preferably a molded thermistor element. Such thermistors may be employed in connection with various types of charger control circuits, either to provide a maximum safe temperature cutoff, or to control the duration of the charge in accordance with the increase of internal battery temperature during charging. In either event, the thermistor unit is inserted through a filling vent of the battery to be charged, as in the case of the thermostatic switch units.

Figure 3:
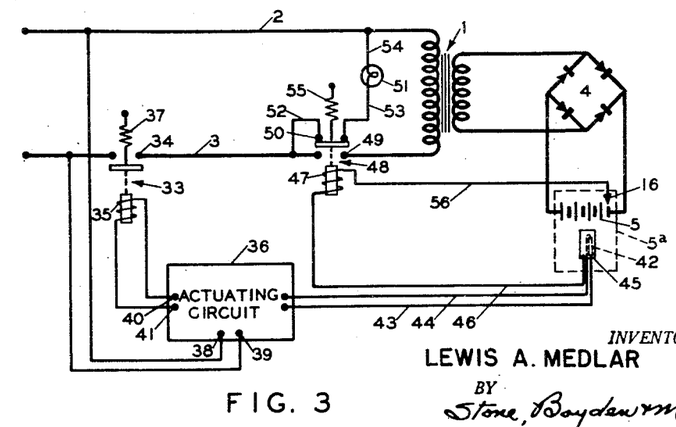
Fig. 3 is a schematic diagram illustrating another form of the invention, as applied to a conventional battery charger, employing a maximum temperature cutoff device under influence of a thermally responsive impedance subjected to the internal temperature of the battery being charged.

Fig. 3 illustrates one form of the invention applied to a battery charger employing a control circuit under influence of a thermally responsive impedance subjected to the internal temperature of the battery being charged, such circuit being arranged to control a relay in the charging circuit in accordance with changes in the battery temperature. The charging circuit is again shown as comprising transformer 1 supplied through conductors 2 and 3 and in turn supplying charging current through rectifier 4 to battery 5.

I provide a relay 33 having contacts 34 in the charging circuit and a winding 35 to be energized by an actuating circuit indicated diagrammatically at 36. The particular nature of the actuating circuit is immaterial to this form of the invention. The actuating circuit may be of the type disclosed in co-pending applications, Serial Number 87,494, filed April 14, 1949, by Lewis A. Medlar and James B. Godshalk; Serial Number 123,722, filed October 26, 1949, by James B. Godshalk and Lewis A. Medlar, and Serial Number 124,612, filed October 31, 1949, by James B. Godshalk, or may be of any other type suitable for actuating a relay in response to changes in value of a thermally responsive impedance. Such actuating circuits may be designed to maintain a relay normally open, which relay is closed when the value of the impedance falls within a predetermined range, or to open a normally closed relay upon occurrence of a predetermined value of the impedance. In the present instance, relay 33 is illustrated as normally closed, as by spring 37. The actuating circuit is illustrated here as comprising supply terminals 38 and 39 connected across the charger supply, and output terminals 40 and 41 connected to winding 35, a thermally responsive impedance 42 being connected into the actuating circuit by conductors 43 and 44. Impedance 42 is provided with a casing 45, preferably in a manner illustrated in detail in Fig. 4 and hereinafter described, and at least a portion of casing 45 is electrically conductive and exteriorly exposed so that it can be brought into electrical contact with the electrolyte of the battery being charged.

Connected to the electrically conductive portion of casing 45 by conductor 46 is winding 47 of a relay 48. Relay 48 is provided with contacts 49 in the charging circuit and contacts 50 in an indicating or signal circuit including a lamp, bell or the like 51, connected across the charging circuit by conductors 52, 53 and 54. Relay 48 is normally biased, as by spring 55, to close contacts 50. The remaining terminal of winding 47 is connected to one of the terminals of battery 5, as at 16, by conductor 56.

The circuit just described is effectively the same as that employed with the thermostatic control device shown in Fig. 1 and previously described. When the conductive portion of casing 45 is in electrical contact with the electrolyte of battery 5, current from the battery is supplied to winding 47 of relay 48, and the relay is thus energized to close contacts 49, completing the charging circuit, if relay 33 is closed. When casing 45 is not in electrical contact with the battery electrolyte, relay 48 is de-energized, contacts 50 are closed, and, if relay 33 is closed, signal or indicator 51 is energized.

Figure 4:
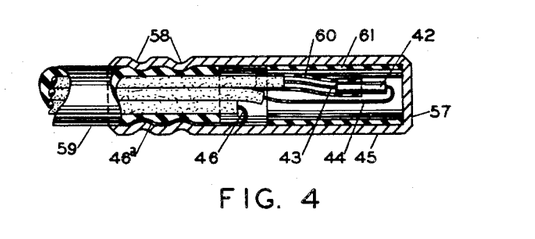
Fig. 4 is a detailed longitudinal section through one form of thermally responsive impedance unit embodying the invention and employed to control the circuit of Fig. 3, parts being shown in elevation.

A preferred form of thermally responsive impedance unit for use with the embodiment of the invention just described is shown in Fig. 4. In this unit, casing 45 is fabricated entirely from a suitable electrically conductive material, preferably lead-plated bronze, the casing being generally tubular and formed with a closed end 57. At its opposite end, casing 45 is secured in fluid-tight relation, as by crimping at 58, over the end of a conventional insulated electrical cable 59 comprising the conductors 43, 44 and 46; identified in Fig. 3. The opposite ends of a thermally responsive impedance 42 are soldered to conductors 43 and 44, so that the impedance is not only electrically connected therewith but is also mechanically supported within the casing entirely by these two conductors. A sleeve 60 of suitable electrical insulating material is positioned over the bared portion of conductor 43 and a major portion of the length of impedance 42. A tube 61 of suitable electrical insulating material is positioned within casing 45 to prevent the impedance and conductor 44 from contacting the casing. Conductor 46 is provided at its end with a bared portion 46ª bent back and clamped between the outer surface of cable 59 and the inner surface of casing 45, and being thereby held in good electrical contact with the casing.

Impedance 42 has been shown as a generally rod-like resistance element, but it will be understood that the impedance may take other forms, as for example, that of a helical resistance coil.

In most instances where the thermally sensitive element is employed to control a so-called fast charger used in the automotive trade, I have found it desirable to employ as the impedance a thermistor prepared by molding and firing semiconductive oxides of metals such as manganese, nickel, cobalt and copper, usually with a suitable binder. Such thermistors are available to the trade either in rod form, generally on the order of ⅛ inch in diameter and ½ inch in length for the preferred resistance values, or in disc form. I have found the rod form to be admirably suited for battery charger control applications.

The embodiment of the thermaly responsive impedance unit illustrated in Fig 4 is well adapted for use with a battery charger control circuit because it is capable of withstanding severe mechanical shocks. But such a unit may be modified in various respects without departing from the spirit of the invention. For example, casing 45 may be of electrical insulating material except for an exteriorly exposed conducting portion to which conductor 46 is connected, as suggested by the unit shown in Fig. 2. Further, casing 45 need not be tubular, other configurations obviously being possible as long as the casing can be inserted through a filling opening of a storage battery casing.

Figure 5:
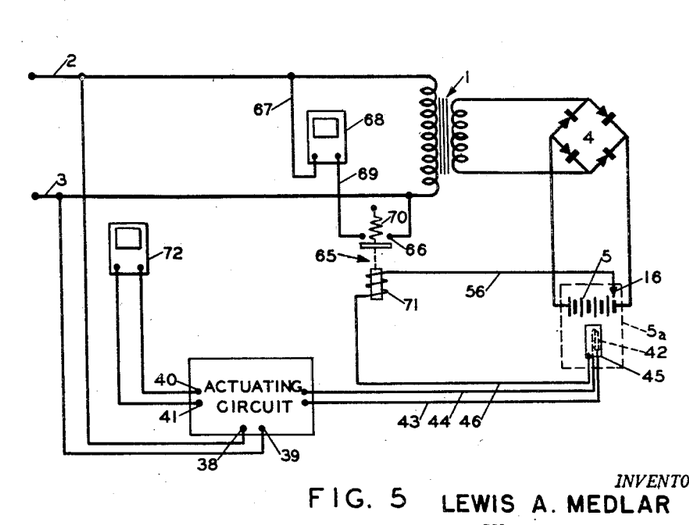
Fig. 5 is a schematic diagram illustrating one form of the invention as applied to a battery charger equipped with an electro-responsive signal operated by an actuating circuit under influence of a thermally responsive impedance subjected to the internal temperature of the battery being charged.

The safety device illustrated in Fig. 3 operates both to break the charging circuit and to complete a signal circuit when the thermally responsive unit is not inserted in the battery. In some commercial applications, particularly where a battery must be maintained at a certain state of charge continuously, it is desirable that charging not be interrupted. In such cases, I prefer to employ the thermally responsive unit to actuate a signal upon occurrence of the predetermined initial battery temperature, and to include in the apparatus a safety circuit which actuates a second signal if the thermally responsive unit is not inserted in the battery being charged. Such an arrangement is illustrated in Fig. 5.

Here, it will be seen that the charging circuit and the control circuit under influence of the thermally responsive unit remain the same as in Fig. 3, except that relay 33 of that figure is replaced by a suitable electro-responsive signal 72. Also, relay 48 of Fig. 3 is replaced by relay 65 having contacts 66. Contacts 66 are arranged in a signal circuit consisting of conductor 67, a signal 68 such as a buzzer or a lamp, and conductor 69. Relay 65 is normally biased to close contacts 66, as by spring 70 and is provided with an actuating winding 71 operable when energized to open contacts 66. Winding 71 is connected to the negative terminal 16 of battery 5 by conductor 56 and to casing 45 of the thermally responsive unit by conductor 46. The thermally responsive unit may be of the type shown in Fig. 4. Thus, when the charging circuit is energized, and the thermally responsive unit has not been inserted in the battery, contacts 66 are closed, since the circuit of energizing winding 71 is broken by reason of the casing of the thermally responsive unit not being in contact with the battery electrolyte. When contacts 66 are closed, signal 68 is energized to warn the operator that the thermally responsive unit is not in the battery. When the thermally responsive unit is inserted in the battery, the circuit of winding 71 is completed through the battery electrolyte, current from the battery energizing relay 48 to open contacts 66 and de-energize signal 68.

Figure 5A:
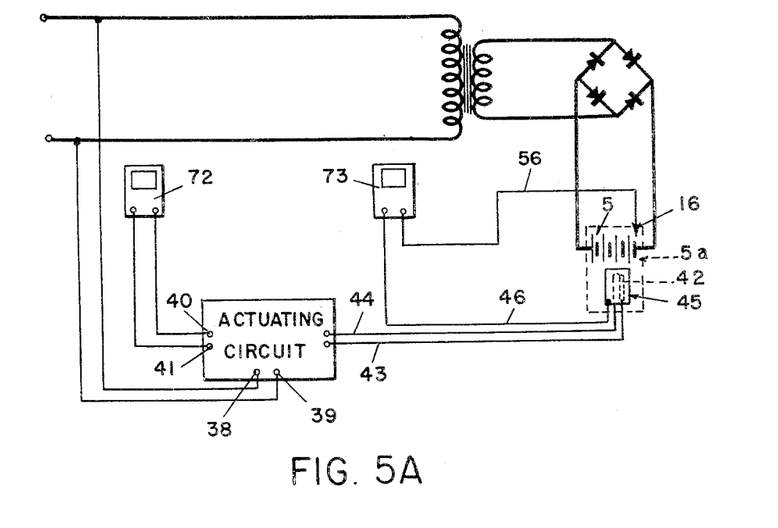
Fig. 5A is a schematic diagram showing the apparatus illustrated in Fig. 5 equipped with a modified form of electro-responsive signal arrangement wherein the signal is energized directly from the battery being charged.

In all of the embodiments of the present invention, it will be seen that I employ an electro-responsive device, such as a relay, controlled by the presence or absence of the thermally responsive unit in the battery to give a desired indication or a circuit controlling action. It will be understood that, where only a signal or indication is desired as the safety factor, as in the device of Fig. 5, a signal may itself be employed as the electro-responsive means controlled by the presence or absence of the thermally responsive unit in the battery. This combination is illustrated in Fig. 5A, wherein the arrangement of the charging circuit and the thermally controlled actuating circuit is identical with that shown in Fig. 5. In Fig. 5A, an electro-responsive signal 73, such as a direct current operated bell or signal lamp, is substituted for the relay 71 of Fig. 5, and it will be seen from this figure that, when the casing 45 is in contact with the battery electrolyte, a circuit comprising the casing 45, conductor 46, signal 73, conductor 56, terminal 16 and the battery electrolyte is completed, and the signal 73 is thus energized by current from the battery. But, this circuit is broken when the casing 45 is removed from contact with the battery electrolyte, and the signal 73 is then de-energized. Though operable, such a system is usually less desirable in actual practice than the circuit of Fig. 5 because it gives the operator a positive signal or indication when the thermally responsive unit is properly in place in the battery, but gives notice of failure to insert the thermally responsive unit only by the de-energized condition of the signal or indicator.

Figure 6:
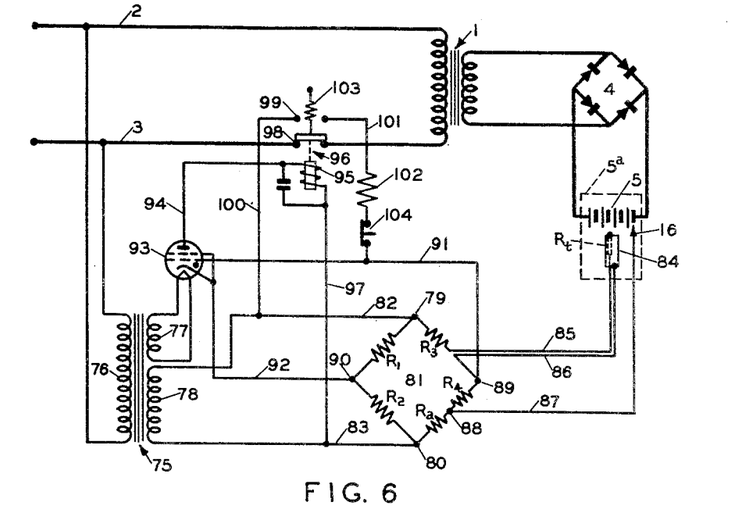
Fig. 6 is a schematic diagram of another form of the invention as applied to a battery charger employing a maximum temperature cutoff device including a bridge-controlled thermionic tube circuit under influence of a thermally responsive impedance unit subjected to the internal temperature of the battery being charged.

Fig. 6 illustrates another embodiment of the invention as applied to a particular type of thermally responsive control circuit for battery chargers. The charging circuit remains the same as in Figs. 1 and 3. The thermally responsive control circuit comprises a transformer 75 having a primary winding 76 bridged across the alternating current supply of the charging circuit, and secondary windings 77 and 78. Secondary winding 78 is connected to the input points 79 and 80 of a Wheatstone bridge 81 by conductors 82 and 83.

Bridge 81 comprises standard, or ratio, resistance arms $R_1$ and $R_2$, a variable arm comprising thermistor $R_t$, and, if required, a supplementary resistance $R_3$, and an arm balancing said variable arm and comprising resistance $R_a$ and, under certain conditions hereinafter described, $R_4$. Thermistor $R_t$ is, in this embodiment of the invention, provided with a conductive casing 84, and the thermistor is connected into the bridge by a circuit comprising conductor 85, thermistor $R_t$, casing 84, and conductor 86, as will be more fully pointed out in connection with Fig. 7, wherein a preferred form of thermistor unit for this circuit is shown. A conductor 87, tapping this arm of the bridge between $R_a$ and $R_4$, as at 88, is connected to one of the terminals of the battery 5 being charged, as at 16. Output terminals 89 and 90 of the bridge 81 are connected by conductors 91 and 92 to the grid and cathode, respectively, of a thermionic tube 93. The plate of tube 93 is connected by conductor 94 to winding 95 of a relay 96, and thence by conductor 97 to bridge input conductor 83 and thus to the input point 80 of the bridge nearest $R_a$. Relay 96 includes contacts 98 in the charging circuit and contacts 99 in an unbalancing circuit comprising conductors 100 and 101 and arranged as shown to connect resistance 102 in parallel with $R_t$ and $R_3$ when contacts 99 are closed. Relay 96 is biased, as by spring 103, to normally close contacts 99.

Figure 7:
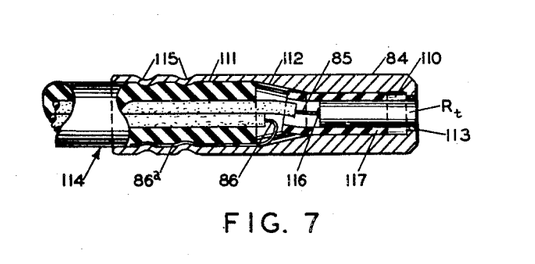
Fig. 7 is a detailed longitudinal section through one form of a thermally responsive impedance unit embodying the invention and employed to control the circuit of Fig. 6, parts being shown in elevation.

A preferred form of thermistor unit for use with the circuit shown in Fig. 6 is illustrated in Fig. 7. It is formed with a generally tubular casing 84, which is preferably fabricated from lead-plated bronze. The casing is provided with a longitudinal bore comprising a portion 110 of relatively small diameter, a portion 111 of relatively large diameter, and an intermediate tapering portion 112, the bore of the casing opening to the exterior at each end. Thermistor $R_t$ is positioned within smaller portion 110 of said bore and is secured in place at one end by a solder joint 113, the solder joint serving to support the thermistor, to connect the thermistor electrically to the casing 84, and to seal the smaller end of the bore against entrance of liquid. The opposite end of the tubular casing 84 is secured over the relatively thick outer insulating sheath of a conventional electrical cable 114, as by crimping the casing wall at 115. Cable 114 includes conductors 85 and 86, conductor 85 being bared at its end and soldered to the end of thermistor $R_t$ at 116. A sleeve of suitable electrical insulating material 117 is provided over the bared end of conductor 85 and a major portion of the length of thermistor $R_t$, as shown. Conductor 86 is provided with a bared end portion $86^a$ bent back along the outer surface of the insulating sheath of cable 114, so that portion $86^a$ is clamped between said outer surface and the inner surface of casing 84, the conductor therefore being in good electrical contact with the casing.

A continuous electrical path is thus provided through conductor 85, thermistor $R_t$, casing 84 and conductor 86. Further, when the unit is inserted with a battery so as to be in contact with the battery electrolyte, solder joint 113 and casing 84 are in electrical contact with the battery electrolyte.

Referring again to Fig. 6, it will be seen that, when casing 84 is not in contact with the battery electrolyte, resistance $R_4$ is included in the arm of bridge 81 containing resistance $R_a$. But, when casing 84 is in contact with the battery electrolyte, resistance $R_4$ is short circuited out of the bridge by an electrical path comprising conductor 86, battery 84, the battery electrolyte and conductor 87.

Except for resistance $R_4$ and the means just described for short circuiting $R_4$ from the bridge, the thermally responsive circuit of Fig. 6 is generally similar to that described in the aforesaid co-pending application, Serial Number 87,494, filed April 14, 1949, by Lewis A. Medlar and James B. Godshalk.

As explained in said co-pending application, the arrangement of such a thermally responsive circuit can be varied in a number of respects, depending upon the particular conditions of use. In the form illustrated in Fig. 6, $R_2 = 2R_1$, and $R^a$ is chosen to substantially balance the thermistor arm of the bridge when thermistor $R_t$ is at the predetermined maximum temperature and $R_4$ is short-circuited from the bridge.

Thermistor $R_t$, in this form of the invention, has a negative temperature coefficient. Also, it is desirable, in order that maximum sensitivity be obtained, that thermistor $R_t$ be used alone, providing the full resistance value of its arm of the bridge. But, supplementary resistance $R_3$ can be used in those instances where a thermistor of the value required for the bridge is not obtainable.

Tube 93 is preferably a thyratron. When thermistor $R_t$ is at a temperature substantially below the predetermined cutoff temperature, as for example when inserted in a normally cool battery to be charged, and $R_4$ is shunted from the bridge by the insertion of the thermistor unit in the battery, bridge 81 is unbalanced in a sense causing a bridge output voltage in phase with the plate voltage of tube 93, since the resistance value of the thermistor at that temperature will be relatively high. This in-phase relationship of the bridge output voltage and the plate voltage causes the tube 93 to be conductive. As the internal temperature of the battery increases during charging, the resistance of thermistor $R_t$ decreases, and the bridge approaches a balanced condition.

When the bridge is unbalanced in the sense caused by a relatively high value of thermistor $R_t$, the grid voltage of tube 93 will be in phase with the plate voltage. When the bridge is balanced, the grid voltage will be zero, since there is no potential difference between bridge output terminal 89 and 90. When the bridge is unbalanced in the opposite sense, as by a relatively low resistance value of thermistor $R_t$, the grid voltage of tube 93 will be 180° out of phase with the plate voltage. Thus, as the bridge swings through the balance point as the resistance of thermistor $R_t$ decreases, tube 93 will become non-conductive.

The precise instant at which tube 93 becomes non-conductive will depend upon the particular characteristics of the tube employed. For example, one type of thyratron commonly employed in the electrical arts becomes non-conductive when the grid potential reaches −1 volt at a plate potential of +110 volts, and this of course represents a slight unbalance of the bridge in the present circuit. When, in this specification and the appended claims, I state that the tube responds to balance of the bridge, or to the swinging of the bridge through the balance point, I intend that this terminology shall include those cases where the tube responds as the bridge loosely approaches the balance point.

When tube 93 is conductive, winding 95 of relay 96 is energized, and contacts 98 in the charging circuit are therefore maintained closed. Thus, when the charging circuit is connected to a battery to be charged, and $R_t$ is inserted within the battery, bridge 81 is unbalanced in a sense causing tube 93 to be conductive, winding 95 is energized, and contacts 98 are closed, allowing current to be supplied to the battery. Should the internal temperature of the battery reach the predetermined cutoff value, bridge 81 is substantially rebalanced, tube 93 becomes non-conductive, winding 95 is therefore de-energized, and contacts 98 are opened since the relay is biased by spring 103. Thus the charging circuit is broken. Contacts 99 are closed, connecting resistance 102 in parallel with thermistor $R_t$ and $R_3$ and thereby decisively unbalancing the bridge in a sense to cause tube 93 to remain non-conductive.

The circuit just described can be used either in conjunction with a time switch to provide a maximum safe temperature cutoff action, or without a time switch, in which latter case the duration of the charge is determined by the occurrence of a predetermined maximum internal temperature of the battery during charging. If no time switch is employed, it is desirable that the value of unbalancing resistance 102 be so chosen that so long as resistance 102 is connected into the bridge 81, the bridge cannot be rebalanced in a sense causing tube 93 to be conductive and relay 96 energized. It is therefore necessary that some means be provided for momentarily breaking the circuit of resistance 102 in order that tube 93 may be made conductive to start a charging operation. To accomplish this momentary interruption, I provide a manually operated push-button switch 104 which is normally biased to a closed position. When charging of one battery is completed, unbalancing resistance 102 will be connected into the bridge. Thermistor $R_t$ will return to normal temperature after being removed from the charged battery, but the resulting increase of resistance will not rebalance the bridge so long as resistance 102 is connected in the bridge in parallel with the thermistor. When it is desired to again actuate the charging circuit, momentary opening of switch 104 will remove resistance 102 from the bridge, the bridge will then be unbalanced in a sense causing tube 93 to be conductive, since thermistor $R_t$ has cooled and is at a relatively high resistance. Tube 93 being conductive, relay 96 is actuated to open contacts 99, and resistance 102 is therefore removed from the circuit until the bridge again rebalances to cause tube 93 to be non-conductive.

When the casing 84 is not in electrical contact with the electrolyte of the battery being charged, the resulting addition of resistance $R_4$ to the arm of bridge 81 including resistance $R_a$ unbalances the bridge in the same sense as does an excessive temperature of thermistor $R_t$, the magnitude of resistance $R_4$ being sufficient to cause this unbalance even should the thermistor be cold and therefore of relatively high resistance. Therefore, when resistance $R_4$ is connected in the bridge circuit, tube 93 is maintained non-conductive, contacts 98 of relay 96 are maintained open, and the charging circuit is broken. When resistance $R_4$ is shunted out of the bridge circuit as described, tube 93 will be conductive if the value of the thermistor is in the range existing when the battery is at a temperature below the pre-determined cutoff temperature, contacts 98 will be closed, and the charging circuit will therefore be energized, presuming the circuit of unbalancing resistance 102 has been broken as by momentarily opening switch 104.

Thus, when the casing 84 is in electrical contact with the electrolyte of the battery being charged, charging can proceed, while energization of the charger will be prevented so long as the casing is not in electrical contact with the battery electrolyte, as would be the case if the operator neglected to insert the thermistor unit in the battery. In other words, charging current can be supplied to the battery only when the thermistor unit is in place.

As disclosed in detail in co-pending application Serial Number 87,494, circuits of the type illustrated in Fig. 6 may be arranged to maintain a normally open relay in the charging circuit closed only as long as the internal temperature of the battery is below a predetermined point, or may be arranged to operate in the reverse sense to positively open a normally closed relay upon occurrence of a predetermined internal battery temperature. To obtain the reverse operation, it is necessary to reverse the ratios in bridge 81, to connect the plate circuit to bridge input terminal 79 instead of bridge input terminal 80, and to employ relay contacts 99 in the charging circuit and relay contacts 98 in the unbalancing circuit comprising resistance 102.

Figure 8:
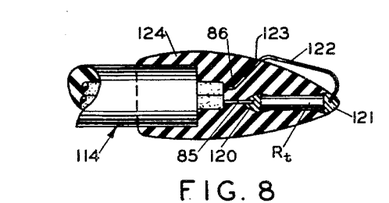
Fig. 8 is a detailed longitudinal section through another form of thermally responsive impedance unit embodying the invention and employed to control the circuit of Fig. 6, parts being shown in elevation.

The embodiment of the thermistor unit shown in Fig. 7 offers particular advantages where the invention is employed in connection with an automotive fast charger subjected to relatively rough handling. It is not necessary, however, that the circuit shown in Fig. 6 employ this particular type of thermistor unit. For example, another type of thermistor unit suitable for use with such a circuit is illustrated in Fig. 8. Here thermistor $R_t$ is again connected to conductors 85 and 86, and these conductors again are part of a conventional insulated cable 114. In this embodiment of the thermistor unit, however, no conductive casing is employed. One end of thermistor $R_t$ is connected to conductor 85 by a solder joint 120. The opposite end of thermistor $R_t$ is connected by a solder joint 121 to a lead conductor 122, and this lead conductor is in turn soldered to the end of conductor 86, as at 123. A mass of insulating material 124 of rubber or the like, formed as by molding or electrodeposition, surrounds the thermistor to prevent its effective length from being reduced by shorting, this insulating material extending over the bared portion of conductors 85 and 86 and over the entire length of the thermistor, but leaving at least a portion of lead conductor 122 exteriorly exposed. When such a thermistor unit is employed in the circuit shown in Fig. 6, and the unit is immersed in the electrolyte of the battery being charged, resistance $R_4$ will then be short-circuited from the bridge 81 by a circuit comprising conductor 86, lead conductor 122, the battery electrolyte, terminal 16, and conductor 87.

Figure 9:
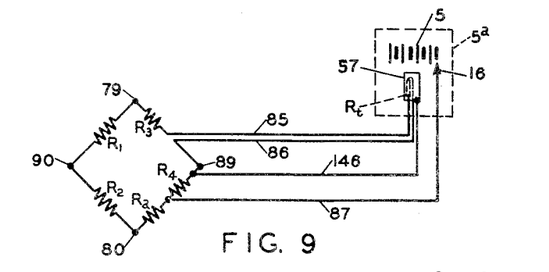
Fig. 9 is a schematic diagram of a modified Wheatstone bridge arrangement for circuits such as that shown in Fig. 6.

It is thus seen that, for successful operation of the embodiment of the invention shown in Fig. 6, it is necessary only that some portion of the electrical path in the thermistor arm of the bridge connecting thermistor $R_t$ and output terminal 89 be in electrical contact with the battery electrolyte when the thermistor unit is properly inserted in the battery. It will further be understood that the circuit could be modified as shown in Fig. 9 by isolating thermistor $R_t$ and conductor 86 electrically from the battery, and employing a short-circuiting path comprising conductor 87, terminal 16, the battery electrolyte, and a conductor 146 connecting casing 57 between resistance $R_4$ and output terminal 89. Such a modification could employ a thermistor unit of the type shown in Fig. 4.

The embodiments of the invention shown in Figs. 6 and 9 employ a thermistor-controlled bridge circuit maintained unbalanced in the desired sense, when the thermistor is not immersed in a battery, by means of an added unbalancing resistance in one arm of the bridge. The same result can be obtained in another manner, as will be clear from Fig. 10. The bridge circuit is illustrated here as again employing ratio resistances $R_1$ and $R_2$ and having a thermally responsive arm including thermistor $R_t$, which is provided with a conductive casing 84, preferably in the manner illustrated in Fig. 7. The arm of the bridge balancing the thermistor arm includes resistance $R_a$ and, connected in parallel therewith, an additional resistance $R_b$. Resistance $R_b$ is connected into the bridge only when the thermistor unit is inserted in battery 5 so that casing 84 is in electrical contact with the battery electrolyte. When this occurs, it will be seen that a continuous electrical path is provided comprising resistance $R_b$, conductor 150, terminal 16, the battery electrolyte, casing 84, and conductor 86.

Figure 10:
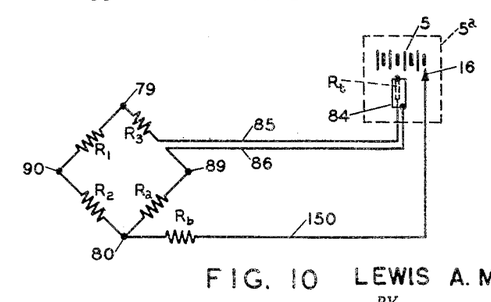
Fig. 10 is a schematic diagram of a further modified Wheatstone bridge arrangement for circuits such as that shown in Fig. 6.

In this embodiment of the circuit, the resistance value of $R_a$ is substantially greater than the resistance of thermistor $R_t$, even when the thermistor is relatively cool. The value of resistance $R_b$ is so chosen that, when resistance $R_b$ is connected in parallel with resistance $R_a$, the bridge will be substantially balanced when thermistor $R_t$ is at the predetermined cutoff temperature. Thus, when resistance $R_b$ is connected into the bridge circuit by insertion of the thermistor unit into the battery to be charged, the circuit will be operative to allow charging, as previously explained in detail in connection with the circuit of Fig. 6, but when the thermistor unit is not inserted in the battery, casing 84 is not in electrical contact with the battery electrolyte, resistance $R_b$ is therefore excluded from the bridge, and the bridge is automatically unbalanced in a sense preventing charging of the battery.

Referring again to Fig. 6, it will be seen that the cathode supply for tube 93 is through winding 78, conductor 82, resistance $R_1$ and conductor 92, and that the tube 93 therefore can be conductive only when the arm of bridge 81 containing resistance $R_1$ is unbroken.

Figure 11:
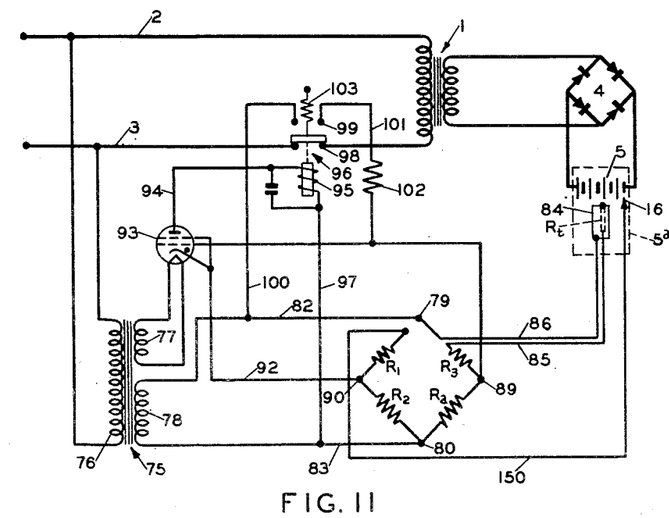
Fig. 11 is a schematic diagram of a modified form of the invention as embodied in a battery charger employing a maximum temperature cutoff circuit generally similar to Fig. 6.

In Fig. 11 is shown a circuit making use of this fact to obtain safety operation without the use of unbalancing resistance. Here, the bridge is again supplied from winding 78 of transformer 75 by conductors 82 and 83, and output terminals 89 and 90 are again connected to the grid and cathode of tube 93 by conductors 91 and 92, the plate circuit of tube 93 remaining as in Fig. 6. In Fig. 11, the thermistor arm of the bridge, reading from input terminal 79, comprises conductor 86, casing 84, thermistor $R_t$, conductor 85, and resistance $R_3$. The arm of the bridge including $R_1$, and through which the cathode supply is drawn, comprises casing 84, the battery electrolyte, terminal 16 of the battery, conductor 150, resistance $R_1$, and output terminal 90. Thus, when the thermistor unit is inserted in the battery, and casing 84 is therefore in electrical contact with the battery electrolyte, the cathode supply circuit for tube 93 is completed and, presuming the battery temperature is substantially below the cutoff temperature, charging can proceed, as previously described in connection with the circuit of Fig. 6. But, when the thermistor unit is not inserted in the battery, the cathode supply circuit is broken, tube 93 cannot be conductive, and the charging circuit therefore cannot be energized.

Figure 12:
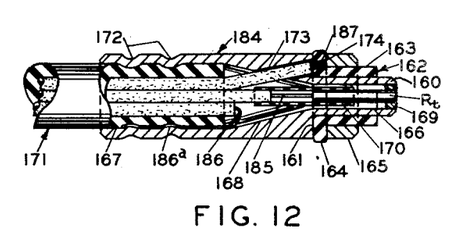
Fig. 12 is a detailed longitudinal section through a modified form of thermistor unit embodying the invention, parts being shown in elevation.

Another form of thermistor unit embodying the invention is illustrated in Fig. 12. Here is shown a casing 184 provided with an end portion 160 of reduced diameter and a shoulder 161. An insulating bushing 162 includes a tubular portion 163 surrounding casing portion 160 and a radial flange 164 positioned against casing shoulder 161. Spaced from portion 160 of the casing by said insulating bushing is a conductive sleeve 165. Casing 184 has a central bore comprising a portion 166 of relatively small diameter within the reduced portion 160 of the casing, a portion 167, of relatively larger diameter at the opposite end of said casing, and an intermediate tapering portion 168. Thermistor $R_t$ is positioned within and closely spaced from the walls of portion 166 of the casing bore, and is electrically connected at one end to the casing by means of a solder joint 169, which seals the end of the small portion of the bore against entrance of liquid. The opposite end of thermistor Rt is soldered to a conductor 185, and an insulating sleeve 170 extends over conductor 185 and the major portion of the length of thermistor Rt. At the end provided with the relatively large bore, casing 184 is secured over the insulating sheath of an electrical cable 171, as by crimping at 172. Cable 171 includes conductors 185, 186 and 187. Conductor 186 is provided with a bared end portion 186ª bent back and clamped between the casing and the insulating sheath of cable 171, so that conductor 186 is in good electrical contact with the casing. Conductor 187 extends through a second bore 173 in the wall of the casing, and through flange 164 of insulating bushing 162, and is electrically connected to conductive sleeve 165 at 174.

When the thermistor unit just described is immersed in the electrolyte of a battery until sleeve 165 is in contact with the electrolyte, an electrically conductive path is provided comprising conductor 186, the casing 184, the battery electrolyte, conductive sleeve 165, and conductor 187. Such a unit can be employed in circuits such as those shown in Figs. 6 and 11, and in either case it will be understood that no connection to the battery terminal is required, since conductive sleeve 165 is employed in its stead.

Where a control circuit embodying a form of the invention requiring one of the battery terminals to be included in the circuit is employed, it is preferred that the terminal of the battery included in the control circuit be the negative, rather than the positive terminal. If the negative terminal is used, deposition of lead oxide upon conductive portions of the casing of the thermally responsive element is eliminated, and the rate of corrosion of any exposed bronze is greatly reduced. It will be understood, however, that the positive terminal may be connected into the circuit, instead of the negative terminal, if desired.

In circuits such as that of Fig. 6, direct current from the battery is introduced into the bridge circuit. Since the resistance of the circuit is high, this results in only a very negligible drain on the battery. However, the presence of a direct current potential in the circuit does affect, to a limited extent, the calibration of the bridge, and the battery potential, and therefore the direct current potential introduced into the bridge circuit, increases slightly during charging. The bridge can be compensated for the initial direct current potential involved, and the change in calibration of the bridge caused by increase of the direct current potential during charging is negligible and can, in most cases, be safely ignored.

However, presence of the direct current potential from the battery being charged in the bridge circuit has another significance if a circuit such as that shown in Fig. 6 is employed. The thermistor unit is ordinarily inserted in the filling opening for the center cell of the battery, and the direct current potential introduced into the bridge circuit is thus the potential between the electrolyte of the center cell and the negative terminal of the battery, when the device is employed in the preferred manner. When the bridge substantially balances, and the tube becomes non-conductive, the resulting breaking of the charging circuit will cause an abrupt decrease in the effective direct current potential in the battery. This decrease may cause a shift in the balance of the bridge equal to the shift which would result from a thermistor temperature change of as much as from 2° F. to 4° F. When the circuit is arranged as shown in Fig. 6, this shift is in a sense causing the thermionic tube to remain non-conductive, and is therefore beneficial to positive operation of the control circuit. But, as previously pointed out, the sense of operation of such a control circuit as that shown in Fig. 6 can be reversed, operating to open a normally closed relay rather than to maintain a normally open relay closed. Such reversal of operation is accomplished by reversing the ratios of the bridge, and reversing the relation of the plate circuit of the tube to the bridge. If the control circuit is so arranged, and the negative terminal of the battery is included in the circuit, as is preferred, the shift in the balance of the bridge resulting from breaking of the charging circuit will be in a sense tending to de-energize the tube and thereby allow the relay to return to its normally closed position, the result being that the tube will tend to oscillate between a conductive and a non-conductive condition. Thus, depending upon the manner in which the circuit is designed, the effect of the direct current potential introduced into the bridge circuit from the battery may be either to insure positive operation of the control circuit, and thus make unbalancing resistance 102, Fig. 6, unnecessary, or to tend to make operation of the circuit less positive, and thereby necessitate the use of said unbalancing resistance.

When a thermally responsive unit of the type shown in Fig. 12 is employed, and conductive ring 165 is employed in the control circuit instead of a terminal of the battery being charged, there is, of course, no direct current potential applied to the bridge from the battery.

Though I have referred to the thermally sensitive unit employed in the invention as being immersed in the battery electrolyte, I do not mean to imply that the unit need be totally covered by the electrolyte. It is only necessary that the conductive portion of the thermistor unit connected into the safety circuit come into electrical contact with the battery electrolyte, and that the thermistor element be in good heat transfer relation with the electrolyte.

I have shown the invention in Fig. 1 as applied to a battery charger employing a time switch to determine duration of the charge, and a separate maximum temperature cutoff circuit to break the charging circuit if the battery reaches an unduly high internal temperature during charging before the time switch opens. In Fig. 6, I have shown the invention as applied to a particular form of thermally responsive circuit capable of use either in a time switch controlled charger, as a maximum temperature cutoff device, or in a charger without a time switch and wherein the thermally responsive circuit itself is used to determine the duration of the charge.

In co-pending application, Serial Number 123,722, filed October 26, 1949, by James B. Godshalk and Lewis A. Medlar, there is disclosed a method of charging whereby duration of the charge is determined in accordance with the extent of rise of internal battery temperature over its initial value, rather than by occurrence of a definite maximum internal temperature. In this co-pending application, there is also disclosed preferred apparatus for charging by the temperature rise method, and that apparatus also includes a relay or the like arranged to make or break the charging circuit, the relay being operated by a thermionic tube circuit controlled in accordance with the output of a bridge including a thermally responsive impedance subjected to the internal temperature of the battery being charged. Operation of the bridge and thermionic tube in the temperature rise apparatus is basically the same as the operation of the circuit described herein with reference to Fig. 6. However, in the apparatus employed for charging by the temperature rise method, the bridge is first substantially balanced with the thermally responsive impedance at the initial internal temperature of the battery being charged, and is then unbalanced a predetermined amount, so that the bridge will come into balance again when the temperature of the battery has traversed a predetermined rise. The safety system of the present invention, especially when in the form shown in Figs. 6 and 10, is particularly well adapted to use with the preferred apparatus illustrated in co-pending application, Serial Number 123,722.

Where either the maximum temperature cut-off method of charging or the temperature rise method is used, the present invention is of particular advantage because the apparatus employed by these two methods provides no means other than the thermally responsive circuit for terminating the charge. Thus, when either of these two methods is utilized the battery would be subject to serious damage through overcharging should the operator neglect to insert the thermally responsive unit in the battery.

Though I have illustrated the invention in Fig. 6 as applied to a particular form of Wheatstone bridge circuit, it will be understood that the invention is not limited to this specific circuit, and that various changes and modifications of the bridge circuit can be made within the scope of the invention. Further, although I prefer to use a negative temperature coefficient thermistor in such a circuit, it will be understood that other thermally responsive impedances may be employed, and that such impedances may, if desired, be of the positive temperature coefficient type.

Where battery chargers of the type described are employed, it is usually desirable that the temperature responsive means operate, through a suitable control system, to interrupt the charging circuit upon occurrence of a predetermined temperature in the battery. This is not always true, however, there being instances wherein conditions of use of the charging apparatus and the battery make interruption of charging undesirable. In such cases, the temperature responsive means can be employed to operate a suitable electro-responsive signal, instead of operating a relay having contacts in the charging circuit. The safety devices of the present invention are applicable to both cases. Therefore, when in the claims I employ the term electro-responsive means, it is intended that this term include either a relay or a suitable signal.

I claim:

1. In a battery charging apparatus, a charging circuit, means including a thermally responsive unit for controlling the supply of current to a battery over said circuit, said thermally responsive unit being constructed to be inserted in the battery to be charged, at least a portion of said thermally responsive unit constituting an exteriorly exposed electrically conductive element, and electro-responsive means controlled by contact of said electrically conductive element of said unit with the electrolyte of the battery being charged.

2. In a battery charger, a charging circuit for supplying charging current to the battery to be charged; a thermally responsive unit constructed to be inserted in the battey to be charged, a portion of said unit constituting an exteriorly exposed electrically conductive element; first electro-responsive means controlled by said thermally responsive unit, and second electro-responsive means, controlled by contact of said electrically conductive element of said unit with the electrolyte of the battery being charged.

3. In a battery charging apparatus, a charging circuit, means including a thermally responsive unit for controlling the supply of current to the battery over said circuit, said thermally responsive unit being constructed to be inserted in the battery being charged, a portion of said unit constituting an exteriorly exposed electrically conductive element, and means preventing the completion of said charging circuit unless said electrically conductive element of said thermally responsive unit is in electrical contact with the electrolyte of the battery being charged.

4. In a battery charging apparatus, a charging circuit; a contactor arranged to make and break said charging circuit; means including a thermally responsive unit constructed to be inserted in the battery being charged for maintaining said contactor closed to complete said charging circuit in response to predetermined temperature conditions within said battery, a portion of said thermally responsive unit constituting an exteriorly exposed electrically conductive element, and electrical means preventing closing of said contactor if said electrically conductive element of said thermally responsive unit is not in electrical contact with the electrolyte of the battery being charged.

5. In a battery charging apparatus, a charging circuit for supplying current to a battery; a thermally responsive element adapted to be subjected to the internal temperature of the battery being charged; means under influence of said thermally responsive element for controlling energization of said charging circuit; a casing carrying said thermally responsive element, at least a portion of said casing constituting an exteriorly exposed electrically conductive element, and electrical means preventing energization of said charging circuit so long as said electrically conductive element of said casing is not in electrical contact with the electrolyte of the battery being charged.

6. In a battery charging apparatus, a charging circuit for supplying charging current to a battery, a thermally responsive unit constructed to be inserted through the filling opening of the battery being charged, a portion of said unit constituting an exteriorly exposed electrically conductive element arranged to be in electrical contact with the electrolyte of the battery when said unit is inserted therein; means under influence of said thermally responsive unit for controlling energization of said charging circuit, and signal means for indicating when contact between said electrically conductive element and the electrolyte of the battery is lacking.

7. In a battery charging apparatus, a charging circuit for supplying charging current to the battery; a temperature responsive unit constructed to be inserted in the battery, whereby said unit is subjected to the internal temperature of the battery during charging; means under influence of said temperature responsive unit for controlling said charging circuit in accordance with changes in the internal temperature of the battery being charged, a portion of said temperature responsive unit constituting an exteriorly exposed electrically conductive element and being in electrical contact with the battery electrolyte when said unit is inserted in the battery; a signal circuit including a relay having an actuating winding, a set of contacts in said charging circuit and a set of contacts in said signal circuit and being normally biased to close the contacts in said signal circuit, and a circuit electrically connecting the winding of said relay to said electrically conductive element of said temperature responsive unit and to one terminal of the battery being charged, whereby said relay is energized to complete said charging circuit only when said electrically conductive element of said temperature responsive units is in electrical contact with the electrolyte of the battery being charged, and said signal circuit is completed only when said relay is relaxed.

8. In a battery charging apparatus, a charging circuit; a thermally responsive unit constructed to be inserted in the battery to be charged, a portion of said thermally responsive unit constituting an exteriorly exposed electrically conductive element; means under influence of said thermally responsive unit for making and breaking said charging circuit; a signal circuit arranged to be energized only when said charging circuit is energized; a relay having an actuating winding and a set of contacts in said signal circuit and being normally biased to close said contacts, and a circuit for energizing said actuating winding to close said contacts and being arranged to be completed only when said electrically conductive element of said thermally responsive unit is in electrical contact with the electrolyte of the battery being charged.

9. In a battery charging apparatus, a charging circuit for supplying charging current to a battery; a balanceable network including a thermally responsive impedance adapted to be subjected to the internal temperature of the battery being charged, the arrangement being such that said network is unbalanced in one sense when the internal temperature of the battery being charged is below a predetermined value and is substantially rebalanced when the internal temperature of the battery reaches said predetermined value during charging; a contactor arranged to make and break said charging circuit; means responsive to the output of said network for maintaining said contactor closed when said network is unbalanced in said one sense and for opening said contactor when said network substantially rebalances, and electrical means preventing said network from being unbalanced in said one sense when said impedance is not subjected to the internal temperature of the battery being charged.

10. A battery charger comprising a charging circuit for supplying charging current to a battery; a contactor arranged to make and break said charging circuit; a balanceable network including a temperature responsive impedance, said impedance being adapted to be subjected to the internal temperature of the battery being charged; a circuit for controlling said contactor in response to predetermined output conditions of said network; a casing carrying said impedance, at least a portion of said casing constituting an exteriorly exposed electrically conductive element and being adapted to be brought into electrical contact with the electrolyte of the battery being charged; an unbalancing impedance connected in said network and capable of unbalancing said network to an extent and in a sense sufficient to cause said contactor to be opened, and a circuit including said electrically conductive element of said casing for short circuiting said unbalancing impedance from said network only when said electrically conductive element is in electrical contact with the electrolyte of the battery being charged.

11. In a battery charging apparatus, a charging circuit for supplying charging current to a battery; a Wheatstone bridge including in one arm a thermally responsive impedance having a negative temperature coefficient and adapted to be subjected to the internal temperature of the battery being charged, whereby said bridge is unbalanced in one sense when the internal temperature of the battery being charged is below a predetermined value, and is substantially rebalanced when the internal temperature of the battery reaches said predetermined temperature during charging; a relay having contacts in said charging circuit and being normally biased to an open position; means responsive to the output of said bridge for maintaining said relay closed only when said bridge is unbalanced in said one sense; an unbalancing impedance in the arm of said bridge balancing said thermally responsive impedance, and means for shunting said unbalancing impedance from said bridge only when said thermally responsive impedance is subjected to the internal temperature of the battery being charged, the value of said unbalancing impedance being such as to prevent said bridge from being unbalanced in said one sense when said unbalancing impedance is connected in said bridge.

12. In a battery charging apparatus, a charging circuit for supplying charging current to a battery; a Wheatstone bridge including in one arm a thermally responsive impedance having a negative temperature coefficient and adapted to be subjected to the internal temperature of the battery being charged, whereby said bridge is unbalanced in one sense when the internal temperature of the battery being charged is below a predetermined value, and is substantially rebalanced when the internal temperature of the battery reaches said predetermined temperature during charging; a relay having contacts in said charging circuit and being normally biased to an open position; means responsive to the output of said bridge for maintaining said relay closed only when said bridge is unbalanced in said one sense; an unbalancing impedance in the arm of said bridge balancing said thermally responsive impedance; a casing carrying said thermally responsive impedance, at least a portion of said casing constituting an exteriorly exposed electrically conductive element and being adapted to be brought into electrical contact with the electrolyte of the battery to be charged, and an electrical circuit including said electrically conductive element of said casing and a terminal of the battery being charged for short circuiting said unbalancing impedance from said bridge only when said electrically conductive element is in electrical contact with the electrolyte of the battery being charged, the value of said unbalancing impedance being such as to prevent said bridge from being unbalanced in said one sense when said unbalancing impedance is connected in said bridge.

13. In a battery charging apparatus, a charging circuit for supplying charging current to a battery; a Wheatstone bridge; a thermally responsive impedance having a negative temperature coefficient; a casing carrying said thermally responsive impedance, at least a portion of said casing constituting an exteriorly exposed electrically conductive element, one terminal of said impedance being connected directly into one arm of said bridge and the other terminal of said impedance being connected into said one arm of said bridge through said electrically conductive element of said casing; a relay having contacts in said charging circuit and being normally biased to open said contacts; means responsive to the output of said bridge for energizing said relay to close said contacts only when said bridge is unbalanced in a sense caused by a low temperature of said thermally responsive impedance; an unbalancing impedance in the arm of said bridge balancing said thermally responsive impedance, and a shunt circuit for removing said unbalancing impedance from said bridge, said shunt circuit including said exteriorly exposed element of said casing and means electrically connectable to the negative terminal of the battery being charged, whereby said unbalancing impedance is shunted from said bridge only when said exteriorly exposed element is in electrical contact with the electrolyte of the battery being charged.

14. In a battery charging apparatus, a charging circuit for supplying charging current to a battery; a Wheatstone bridge including in one arm a thermally responsive impedance having a negative temperature coefficient and adapted to be subjected to the internal temperature of the battery being charged, whereby said bridge is unbalanced in one sense when the internal temperature of the battery being charged is below a predetermined value, and is substantially rebalanced when the internal temperature of the battery reaches said predetermined temperature during charging; a relay having contacts in said charging circuit and being normally biased to an open position; means responsive to the output of said bridge for maintaining said relay closed only when said bridge is unbalanced in said one sense; the arm of said bridge balancing said thermally responsive impedance comprising a first impedance and a second impedance, said second impedance being connected in parallel with said first impedance only when said thermally responsive impedance is subjected to the internal temperature of the battery being charged and being disconnected from said bridge when said thermally responsive impedance is not subjected to the internal temperature of the battery being charged, the value of said first impedance being such as to prevent said bridge from being unbalanced in said one sense when said second impedance is not connected in parallel therewith.

15. In a battery charging apparatus, a charging circuit for supplying charging current to a battery; a Wheatstone bridge including in one arm a thermally responsive impedance having a negative temperature coefficient and adapted to be subjected to the internal temperature of the battery being charged, whereby said bridge is unbalanced in one sense when the internal temperature of the battery being charged is below a predetermined value, and is substantially rebalanced when the internal temperature of the battery reaches said predetermined temperature during charging; a relay having contacts in said charging circuit and being normally biased to an open position; means responsive to the output of said bridge for maintaining said relay closed only when said bridge is unbalanced in said one sense; the arm of said bridge balancing said thermally responsive impedance comprising a first impedance and a second impedance; a casing carrying said thermally responsive impedance, at least a portion of said casing constituting an exteriorly exposed electrically conductive element and being adapted to be brought into electrical contact with the electrolyte of the battery being charged, and an electrical circuit connecting said second impedance in parallel with said first impedance only when said electrically conductive element of said casing is in electrical contact with the electrolyte of the battery being charged, the value of said first impedance being such as to prevent said bridge from being unbalanced in said one sense when said second impedance is not connected in parallel therewith.

16. In a battery charger, a charging circuit for supplying charging current to a battery to be charged; a contactor arranged to make and break said charging circuit; a Wheatstone bridge including a thermally responsive impedance adapted to be subjected to the internal temperature of the battery being charged; a thermionic tube having a cathode, a control grid, and a plate, the output terminals of said bridge being connected across the cathode and grid of said tube; an alternating current circuit connected to the input terminals of said bridge, whereby said bridge is supplied by said alternating current circuit, and the cathode of said tube is supplied with alternating current through one input point and an arm of said bridge; a plate circuit for said tube connected to the other input point of said bridge, a winding in said plate circuit for closing said contactor when said tube is energized, and a casing carrying said thermally responsive impedance, at least a portion of said casing constituting an exteriorly exposed electrically conductive element and being adapted for electrical contact with the electrolyte of the battery being charged, the arm of said bridge through which the cathode of said tube is supplied being conductive only when said electrically conductive element of said casing is in electrical contact with the electrolyte of the battery being charged.

17. In a battery charging apparatus, a charging circuit; a contactor arranged to make and break said charging circuit; means including a thermally responsive unit constructed to be inserted in the battery to be charged for maintaining said contactor closed to complete said charging circuit in response to predetermined temperature conditions within said battery, a portion of said thermally responsive unit constituting an exteriorly exposed electrically conductive element; a relay having normally open contacts in said charging circuit and including an actuating winding arranged to close said contacts when energized, and a circuit connecting said actuating winding of said relay to said exteriorly exposed electrically conductive element of said unit and to one terminal of the battery to be charged, whereby said actuating winding of said relay is energized by current from the battery only when said exteriorly exposed electrically conductive element is in contact with the electrolyte of the battery.

18. In a battery charging apparatus, a charging circuit for supplying charging current to a battery; a relay having contacts in said charging circuit and including an actuating winding; a thermally responsive switch; an energizing circuit for said relay including said actuating winding and said switch in series; a casing carrying said switch and constructed to be inserted in the battery to be charged, at least a portion of said casing constituting an exteriorly exposed electrically conductive element; a second relay having normally open contacts in said charging circuit and including an actuating winding arranged to close said contacts when energized, and a circuit connecting said actuating winding of said second relay to said exteriorly exposed element of said casing and one terminal of the battery to be charged; whereby said actuating winding of said second relay is energized by current from the battery only when said exteriorly exposed electrically conductive element is in contact with the electrolyte of the battery.

19. In a battery charging apparatus, a charging circuit; means including a thermally responsive unit for controlling the supply of current to a battery over said charging circuit, said thermally responsive unit being constructed to be inserted in the battery to be charged, at least a portion of said thermally responsive unit constituting an exteriorly exposed electrically conductive element; a circuit including said exteriorly exposed electrically conductive element and one terminal of the battery to be charged, said circuit being completed only when said exteriorly exposed electrically conductive element is in contact with the electrolyte of the battery, and electro-responsive means in said last-mentioned circuit and energized only when said circuit is completed.

LEWIS A. MEDLAR.

REFERENCES CITED

The following references are of record in the file of this patent:

UNITED STATES PATENTS

| Number | Name | Date |
|---|---|---|
| 976,747 | Schmidt | Nov. 22, 1910 |
| 976,748 | Schmidt | Nov. 22, 1910 |
| 1,098,692 | Stahl | June 2, 1914 |
| 1,256,065 | Sheinaus | Feb. 12, 1918 |
| 1,558,076 | Chamberlain | Oct. 20, 1925 |
| 1,634,176 | Cunliffe | June 28, 1927 |
| 1,954,931 | Hambuechen | Apr. 17, 1934 |
| 2,296,924 | Heyer et al. | Sept. 29, 1942 |
| 2,310,514 | Callender | Feb. 9, 1943 |
| 2,354,877 | Peters | Aug. 1, 1944 |
| 2,377,596 | Williams | June 5, 1945 |
| 2,392,737 | Heyer | Jan. 8, 1946 |
| 2,402,695 | Taylor et al. | June 25, 1946 |
| 2,413,865 | Dalzell | Jan. 7, 1947 |
| 2,432,069 | Pugh | Dec. 2, 1947 |